United States Patent
Alexander

(10) Patent No.: US 10,958,979 B2
(45) Date of Patent: *Mar. 23, 2021

(54) SYSTEMS AND METHODS FOR HISTORY-BASED DECISION MAKING IN A TELEVISION RECEIVER

(71) Applicant: DISH Technologies L.L.C., Englewood, CO (US)

(72) Inventor: Michael Alexander, Denver, CO (US)

(73) Assignee: DISH Technologies L.L.C., Englewood, CO (US)

(*) Notice: Subject to any disclaimer, the term of this patent is extended or adjusted under 35 U.S.C. 154(b) by 384 days.

This patent is subject to a terminal disclaimer.

(21) Appl. No.: 15/166,119

(22) Filed: May 26, 2016

(65) Prior Publication Data

US 2016/0309228 A1    Oct. 20, 2016

Related U.S. Application Data

(63) Continuation of application No. 12/819,417, filed on Jun. 21, 2010, now Pat. No. 9,363,464.

(51) Int. Cl.
*H04N 21/466* (2011.01)
*H04N 21/472* (2011.01)
(Continued)

(52) U.S. Cl.
CPC ......... *H04N 21/4667* (2013.01); *H04N 5/775* (2013.01); *H04N 5/782* (2013.01);
(Continued)

(58) Field of Classification Search
None
See application file for complete search history.

(56) References Cited

U.S. PATENT DOCUMENTS 5,956,037 A * 9/1999 Osawa ................ G09B 5/065
345/418
6,177,931 B1   1/2001 Alexander et al.
(Continued)

OTHER PUBLICATIONS

Michael Alexander, Systems and Methods for Automatically Scheduling Recordings of Programming Events; U.S. Appl. No. 12/702,090, filed Feb. 8, 2010.

*Primary Examiner* — An Son P Huynh

(57) ABSTRACT

Various embodiments facilitate history-based decision making in television receivers, such as set-top boxes. In one embodiment, a history-based decision facilitator ("HBDF") is provided. The HBDF facilitates decision making in a television receiver based on device history data received from the television receiver. In one embodiment, the HBDF receives an indication of an operation to be performed by the television receiver, the operation including one or more parameters. In response, the HBDF determines values for the one or more parameters, based on device history data received from the television receiver. The HBDF then provides the determined parameter values to the television receiver. In one example application, the HBDF can determine a tuner of the television receiver to utilize for recording a program, based on the history of the television receiver, such as that the determined tuner is typically idle during the scheduled recording time period.

18 Claims, 6 Drawing Sheets

(51) Int. Cl.

| | | |
|---|---|---|
| *H04N 5/775* | (2006.01) | |
| *H04N 21/433* | (2011.01) | |
| *H04N 21/4335* | (2011.01) | |
| *H04N 5/782* | (2006.01) | |
| *H04N 21/41* | (2011.01) | |
| *H04N 21/442* | (2011.01) | |
| *H04N 5/765* | (2006.01) | |

(52) U.S. Cl.
CPC ..... *H04N 21/4135* (2013.01); *H04N 21/4334* (2013.01); *H04N 21/4335* (2013.01); *H04N 21/44213* (2013.01); *H04N 21/47214* (2013.01); *H04N 5/765* (2013.01)

(56) References Cited

U.S. PATENT DOCUMENTS

| | | | |
|---|---|---|---|
| 6,298,482 B1 | 10/2001 | Seidman et al. | |
| 7,669,222 B2 | 2/2010 | McEnroe et al. | |
| 7,773,859 B1* | 8/2010 | Potrebic | H04N 5/782 386/291 |
| 7,962,935 B2* | 6/2011 | Kurosaki | H04H 20/76 725/39 |
| 8,108,886 B1 | 1/2012 | Murahashi et al. | |
| 8,495,693 B2* | 7/2013 | St. John-Larkin | H04N 5/4401 725/114 |
| 8,856,844 B2* | 10/2014 | Hamano | H04N 5/76 386/296 |
| 9,015,736 B2* | 4/2015 | Cordray | G06F 3/0482 725/10 |
| 9,307,281 B2* | 4/2016 | Bryant | H04N 5/44543 |
| 2002/0056087 A1 | 5/2002 | Berezowski et al. | |
| 2002/0147509 A1* | 10/2002 | Sameshima | G05B 19/0425 700/32 |
| 2002/0174430 A1 | 11/2002 | Ellis et al. | |
| 2003/0018972 A1* | 1/2003 | Arora | H04H 60/65 725/47 |
| 2003/0020744 A1 | 1/2003 | Ellis et al. | |
| 2003/0088871 A1* | 5/2003 | Kimura | G06F 17/30053 725/46 |
| 2003/0149980 A1 | 8/2003 | Hassell et al. | |
| 2003/0149988 A1 | 8/2003 | Ellis et al. | |
| 2003/0226153 A1* | 12/2003 | Bessel | H04N 5/4401 725/152 |
| 2004/0049571 A1* | 3/2004 | Johnson | G06Q 10/10 709/224 |
| 2004/0091249 A1* | 5/2004 | Mekenkamp | H04N 5/76 386/297 |
| 2004/0133448 A1* | 7/2004 | Higashi | G06F 21/10 726/30 |
| 2004/0181814 A1* | 9/2004 | Ellis | H04N 5/44543 725/134 |
| 2004/0258396 A1* | 12/2004 | Nakamura | H04N 5/782 386/293 |
| 2005/0002638 A1* | 1/2005 | Putterman | H04N 5/76 386/213 |
| 2005/0114901 A1* | 5/2005 | Yui | H04N 7/163 725/100 |
| 2005/0149964 A1* | 7/2005 | Thomas | G06Q 30/02 725/9 |
| 2005/0204388 A1* | 9/2005 | Knudson | H04N 5/44543 725/58 |
| 2005/0289616 A1* | 12/2005 | Horiuchi | H04N 5/782 725/89 |
| 2006/0035610 A1* | 2/2006 | Potrebic | H04H 40/18 455/178.1 |
| 2006/0236233 A1* | 10/2006 | Ozawa | H04N 5/44543 715/234 |
| 2006/0242665 A1* | 10/2006 | Knee | H04N 5/44543 725/38 |
| 2007/0058930 A1* | 3/2007 | Iwamoto | H04N 5/782 386/297 |
| 2007/0067820 A1* | 3/2007 | Cha | H04N 21/418 725/151 |
| 2007/0104456 A1* | 5/2007 | Craner | H04N 5/44543 386/291 |
| 2007/0107010 A1* | 5/2007 | Jolna | G06Q 30/02 725/34 |
| 2007/0136753 A1* | 6/2007 | Bovenschulte | H04H 60/31 725/46 |
| 2007/0157209 A1* | 7/2007 | Hashimoto | G06F 9/5011 718/104 |
| 2007/0157237 A1* | 7/2007 | Cordray | H04H 60/65 725/42 |
| 2007/0157281 A1* | 7/2007 | Ellis | H04N 7/17309 725/134 |
| 2007/0171198 A1* | 7/2007 | Yokozawa | G06F 3/1423 345/156 |
| 2007/0182867 A1* | 8/2007 | Price, III | H04N 5/50 348/731 |
| 2007/0226344 A1* | 9/2007 | Sparrell | H04L 41/0896 709/226 |
| 2008/0040750 A1* | 2/2008 | Taylor | G11B 27/034 725/55 |
| 2008/0059884 A1* | 3/2008 | Ellis | H04N 5/44543 715/721 |
| 2008/0066106 A1 | 3/2008 | Ellis et al. | |
| 2008/0075423 A1* | 3/2008 | DeBie | H04N 5/76 386/291 |
| 2008/0101763 A1* | 5/2008 | Bhogal | H04N 5/782 386/291 |
| 2008/0141303 A1* | 6/2008 | Walker | H04N 21/4334 725/39 |
| 2008/0166103 A1* | 7/2008 | Tajime | G11B 20/00086 386/253 |
| 2008/0273856 A1* | 11/2008 | Bumgardner | H04N 5/782 386/292 |
| 2008/0307470 A1* | 12/2008 | Kanayama | H04N 5/76 725/100 |
| 2009/0055870 A1* | 2/2009 | Horibe | H04N 5/4401 725/46 |
| 2009/0094321 A1* | 4/2009 | Ueda | G06F 17/30017 709/203 |
| 2009/0133048 A1* | 5/2009 | Gibbs | G06F 17/30038 725/14 |
| 2009/0133070 A1* | 5/2009 | Hamano | G06F 21/6218 725/46 |
| 2009/0222875 A1* | 9/2009 | Cheng | H04H 20/63 725/147 |
| 2009/0249204 A1* | 10/2009 | Sugiura | G06F 17/30227 715/708 |
| 2010/0031162 A1* | 2/2010 | Wiser | G06Q 30/0255 715/747 |
| 2010/0031282 A1* | 2/2010 | Torimaru | H04N 5/44543 725/9 |
| 2010/0158476 A1* | 6/2010 | Hao | H04N 5/782 386/291 |
| 2010/0192178 A1* | 7/2010 | Candelore | G06K 9/325 725/39 |
| 2010/0211988 A1* | 8/2010 | Pettit | H04N 21/4122 725/134 |
| 2010/0333137 A1* | 12/2010 | Hamano | H04H 60/46 725/39 |
| 2011/0013091 A1* | 1/2011 | Kim | H04N 7/163 348/731 |
| 2011/0072452 A1* | 3/2011 | Shimy | H04N 7/163 725/25 |
| 2011/0078717 A1* | 3/2011 | Drummond | H04N 21/4586 725/14 |
| 2011/0162020 A1* | 6/2011 | Kahn | H04N 21/4263 725/82 |
| 2011/0197279 A1* | 8/2011 | Ueoka | G06F 21/56 726/24 |
| 2012/0079540 A1* | 3/2012 | Myers | H04N 5/4401 725/61 |
| 2013/0071092 A1* | 3/2013 | Willame | H04N 5/76 386/293 |

* cited by examiner

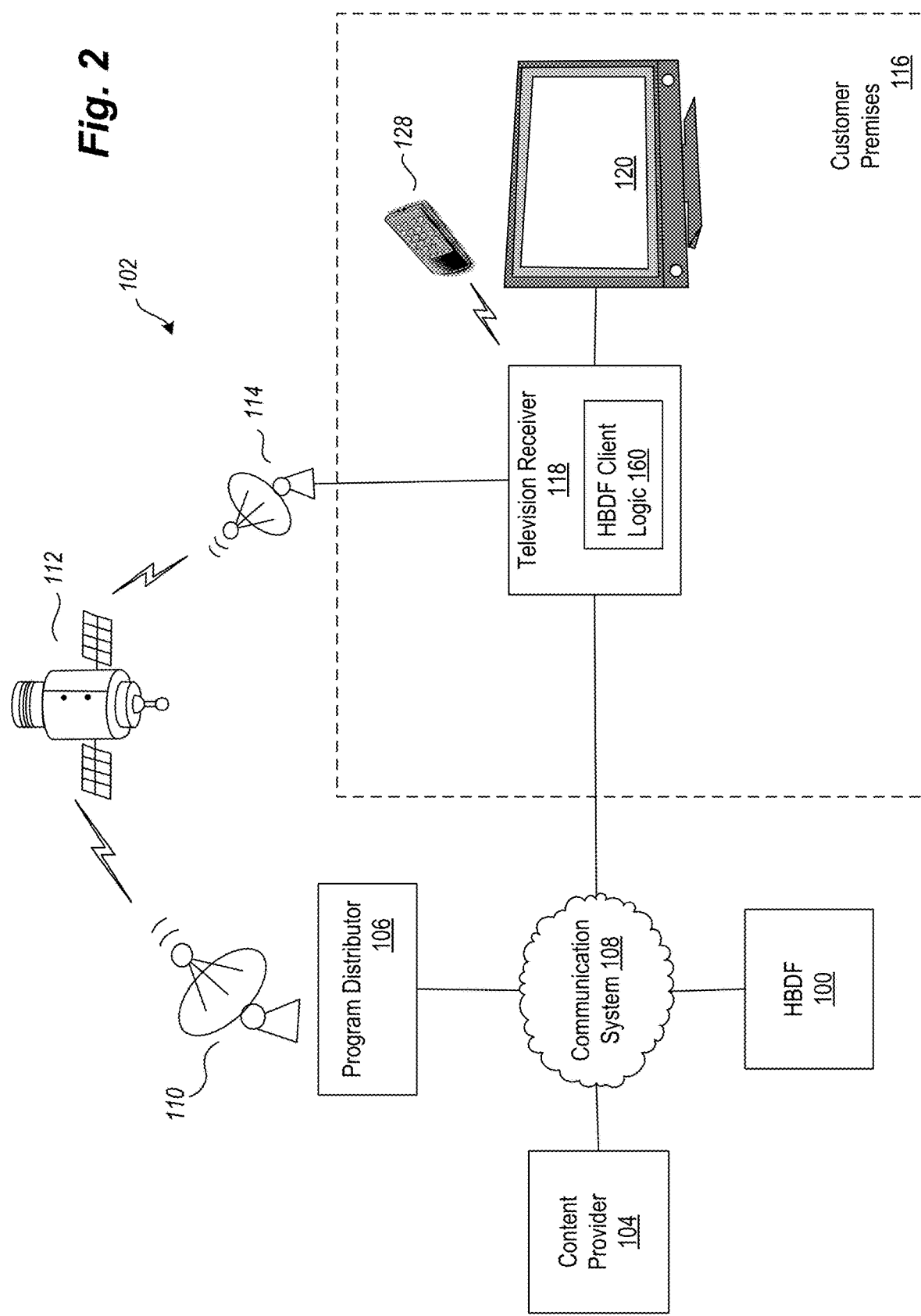

| | DeviceID | Operation | ChannelNum | StartTime | Duration | ProgramID | Tuner | ... |
|---|---|---|---|---|---|---|---|---|
| 204a | 1001 | VIEW | 13 | 2010-05-04-17:32:56 | 45 | 1234 | 1 | |
| 204b | 1023 | RECORD | 43 | 2010-05-05-15:00:00 | 60 | 1009 | 2 | |
| 204c | 1003 | DELETE | -- | 2010-05-05-16:22:26 | -- | 3473 | -- | |
| 204d | 1002 | VIEW | 234 | 2010-05-05-16:24:55 | 23 | 2399 | 1 | |
| 204e | 1032 | VIEW | 43 | 2010-05-05-16:47:03 | 45 | 3634 | 1 | |
| 204f | 1002 | VIEW | 234 | 2010-05-05-17:32:28 | 107 | 0155 | 2 | |
| 204g | 1023 | RECORD | 13 | 2010-05-07-13:00:00 | 30 | 6703 | 2 | |
| 204h | 1003 | DELETE | -- | 2010-05-08-19:29:37 | -- | 5699 | -- | |
| 204i | 1001 | VIEW | 110 | 2010-05-08-22:08:01 | 84 | 3421 | 1 | |
| 204j | ... | | | | | | | |

*Fig. 3A*

SYSTEMS AND METHODS FOR HISTORY-BASED DECISION MAKING IN A TELEVISION RECEIVER

PRIORITY CLAIM

This patent application is a Continuation of U.S. Non-Provisional patent application Ser. No. 12/819,417, filed Jun. 21, 2010, published as U.S. Publication No. 2011/0310305, entitled "SYSTEMS AND METHODS FOR HISTORY-BASED DECISION MAKING IN A TELEVISION RECEIVER," issued as U.S. Pat. No. 9,363,464 on Jun. 7, 2016, which is hereby incorporated herein by reference in its entirety.

TECHNICAL FIELD

The technical field relates to facilitating history-based decision making and more particularly, to apparatus, systems, and methods for facilitating decision making in a television receiver, such as a set-top box, based on device history information.

BACKGROUND

Set-top boxes include hardware and software components that are limited in various ways. For example, a set-top box may include a hard disk that has limited storage capacity, a video processor that has limited bandwidth, a limited number of tuners, or the like. Existing set-top boxes can require considerable user configuration to manage the limited hardware and software resources. For example, when a hard disk or other storage device reaches or nears capacity, a user may be asked to manually specify stored programs to delete from the storage device. Similarly, when a program is to be recorded, a user may be asked to indicate a tuner to utilize to receive the program for recording. Accordingly, there is a need to provide improved resource management capabilities for set-top boxes and other media television receivers.

BRIEF SUMMARY

In one embodiment, a method for facilitating decision making in a television receiver is provided. The method includes receiving an indication of a function to be performed by a television receiver, the function including one or more parameters; determining values for the one or more parameters based on device history data that reflects past operation of the television receiver; and causing the television receiver to perform the function with the determined values for the one or more parameters.

Other embodiments provide systems and computer-readable storage media configured to perform methods similar to the one described above.

BRIEF DESCRIPTION OF THE DRAWINGS

The components in the drawings are not necessarily to scale relative to each other. Like reference numerals designate corresponding parts throughout the several views.

FIG. 2 is a block diagram illustrating an example content distribution environment in which embodiments of a history-based decision facilitator may be implemented.

FIGS. 3A-3B are block diagrams illustrating example user interfaces and/or example device history information provided and utilized by example embodiments.

DETAILED DESCRIPTION

A. Environment Overview

Figure 1:
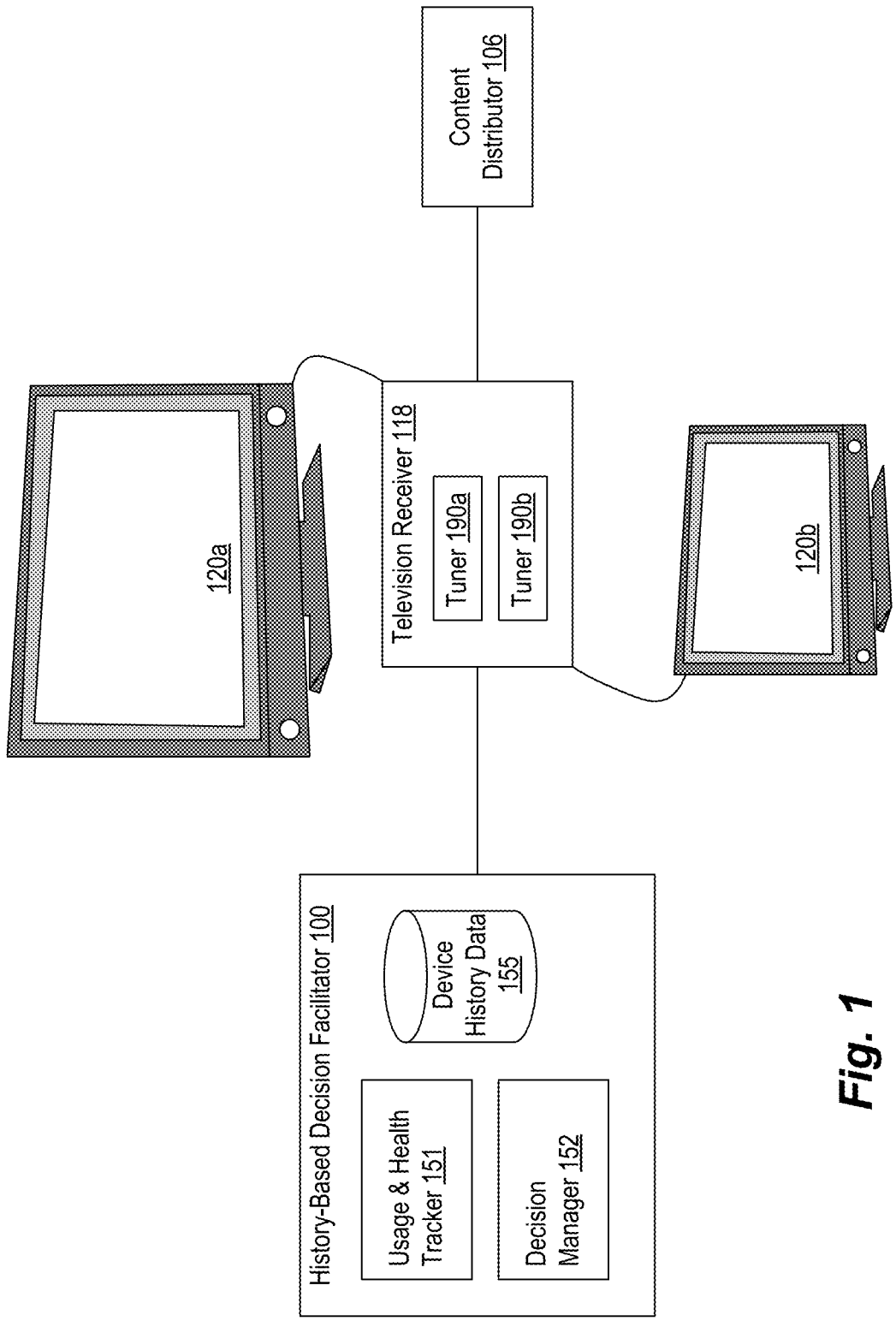
FIG. 1 is a block diagram illustrating functional elements of an example embodiment of a history-based decision facilitator.

FIG. 1 is a block diagram illustrating functional elements of an example embodiment of a history-based decision facilitator ("HBDF") 100. The HBDF 100 facilitates decision making in a television receiver 118, such as a set-top box, based on device history information. More particularly, the HBDF 100 can assist the television receiver 118 to automatically or semi-automatically make decisions or determinations about functions or operations to be performed by the television receiver 118. Decisions may be based at least in part on past operations performed by the television receiver 118 and/or other television receivers. In one example embodiment, when a user schedules a recording operation, the television receiver 118 may request that the HBDF 100 determine which tuner to utilize to perform the recording, based on the device history maintained by the HBDF 100. Other types of decisions are contemplated, including but not limited to, determining or identifying functions to be performed by the television receiver 118 (e.g., determining to initiate or schedule a recording operation), determining values for parameters for functions to be performed by the television receiver 118 (e.g., determining a program, time, tuner, channel, or the like, for a recording operation), and the like. Function parameters specify various aspects and/or operations performed by a corresponding function. For example, recording time parameter for a recording function may be used to specify the time and/or duration of a recording; a channel parameter for a recording function may be used to specify a channel to record; and a tuner parameter for a recording function may be used to specify a tuner to use to receive a program for recording.

In the illustrated example, the television receiver 118 comprises two tuners 190a and 190b and is communicatively coupled to two presentation devices 120a and 120b. The tuners 190a and 190b can be used to concurrently receive two different programs transmitted by a content distributor 106 (e.g., a satellite television broadcaster), and present each of the received programs on a respective one of the presentation devices 120a and 120b. In this manner, the television receiver 118 can provide programming to two presentation devices 120a and 120b that may be located in different parts of a customer's premises, such as a living room and a bed room.

In one embodiment, the HBDF 100 includes a usage and health tracker 151, a decision manager 152, and device history data 155. The tracker 151 receives device data from the television receiver 118, and stores the received data as device history data 155. The device data may be received in various ways. For example, the television receiver 118 may be configured to transmit the device data to the HBDF 100 on a periodic basis, such as daily, weekly, monthly, or the like. In another embodiment, the television receiver 118 may be configured to transmit the device data upon the occurrence of some event, such as after a specified amount of data (e.g., 100 kilobytes, 50 records) has been accumulated locally to the television receiver 118. Various protocols for communicating the device data between the television receiver 118 and the HBDF 100 are contemplated, including the television receiver 118 transmitting the device data upon receiving a request from the HBDF 100 (e.g., a pull protocol), the television receiver 118 transmitting the device data without initiation by the HBDF 100 (e.g., a push protocol), and the like.

Device data includes information that reflects the usage and operation of the television receiver 118. More particularly, device data may reflect the operation/usage of the television receiver by including indications of functions/ operations performed by the television receiver 118 (e.g., indications of channels or programs that have been viewed or recorded), the operational state of the television receiver 118 (e.g., device parameters, error conditions, status or health information), and the like. Information about the operational state of the television receiver 118 includes information about the "health" of the television receiver 118. Such information may include, for example, information about various hardware conditions, software conditions, connectivity conditions, operating environment information, television receiver temperature, and the like. Connectivity conditions may include information about whether or not particular types of cables, such as Ethernet, USB, and the like, are connected to a television receiver; information about various communication interfaces, such as signal strength and/or signal to noise ratios; and the like. In addition, operating environment information may include information about settings, user preferences, environment variables, and the like, that are associated with a television receiver 118 and/or its associated devices, such as a presentation device. For example, operating environment information may include internal television receiver settings or preferences such as modulated output frequency, output resolution, audio output/format preferences, and the like; display resolution or other settings, such as volume, contrast, color adjustment, and the like, of a presentation device that is communicatively coupled to a television receiver; and the like.

The decision manager 152 assists the television receiver 118 in making operational decisions, based on the stored device history data 155. In one embodiment, the television receiver 118 transmits an indication of an operation to be performed to the HBDF 100, and in response, the HBDF 100 provides indications of suggested, recommended, or default parameter values for the indicated operation. As one example, the decision manager 152 may determine which one of tuners 190a and 190b to utilize for purposes of recording a scheduled program. More particularly, suppose that a user of the television receiver 118 schedules a recording of a particular program that is to be transmitted at 10 PM. In response, the television receiver 118 transmits to the HBDF 100 a request including an indication that a recording operation has been scheduled for 10 PM. Upon receiving the request, the decision manager 152 determines that, based on the device history data 155, the user typically watches programming received by tuner 190b upon presentation device 120b located in his bedroom during the late evening (e.g., after 10 PM). Based on this understanding of the user's viewing patterns, the decision manager 152 then determines to use tuner 190a for purposes of performing the scheduled recording. Finally, the decision manager 152 responds to the received request by transmitting an indication of tuner 190a as the recommended tuner to use for recording to the television receiver 118.

Although the HBDF 100 is here illustrated as separate from the television receiver 118, in other embodiments, functions of the HBDF 100 may be distributed in different ways. In particular, in one embodiment, at least some of the described functions of the HBDF 100 are performed locally by the television receiver 118. At one extreme, the television receiver 118 performs all of the operations in isolation, for example by storing and executing local versions of modules 151, 152, and 155. In another embodiment, the television receiver has a local decision manager 152 while device history data management functions are provided remotely by the HBDM 100 (or some other system).

In addition, other embodiments of the HBDM 100 do not include all of the illustrated modules. For example, in some embodiments, device history data management functions, such as are provided by the usage and health tracker 151 and the device history data 155, are performed by some system that is remote and separate from the HBDM 100.

FIG. 2 is a block diagram illustrating an example content distribution environment 102 in which embodiments of an HBDF 100 may be implemented. In the content distribution environment 102, audio, video, and/or data service providers, such as, but not limited to, television service providers, provide their customers audio/video/data programming (hereafter, collectively and/or exclusively "programming"). Such programming is often provided by use for the television receiver 118 that is communicatively coupled to the presentation device 120 that is configured to receive and display the programming.

In the illustrated embodiment, the television receiver 118 includes client logic 160 for interacting with the HBDF 100 via the communication system 108. The client logic 160 reports, from time to time, device data to the HBDF 100, such that the HBDF 100 can record a device history for the television receiver 118. Then, the television receiver 118 cooperates with the HBDF 100 in order to determine operations and/or operation parameter values based on the recorded device history. For example, when a user schedules a recording operation, the television receiver 118 may request that the HBDF 100 determine which tuner to utilize to perform the recording, based on the device history maintained by the HBDF 100. As noted, in other embodiments, some or all of the functions of the HBDF 100 may instead be performed locally by the television receiver 118.

The television receiver 118 interconnects to one or more communications or media sources (e.g., a cable head-end, satellite antenna, telephone company switch, Ethernet portal, over-the-air antenna) that provide the programming. The television receiver 118 commonly receives programming by way of the communications media or sources described in greater detail below. Based upon selection by a user, such as may be input via remote control 128 or other input mechanism, the television receiver 118 processes and communicates the selected programming to the presentation device 120.

For convenience, the television receiver 118 may be interchangeably referred to as a "television converter," "receiver," "receiving device," "set-top box," "television television receiver," "television receiver," "television recording device," "satellite set-top box," "satellite receiver," "cable set-top box," "cable receiver," "media player," and/or "television tuner." Accordingly, the television receiver 118 may be any suitable converter device or electronic equipment that is operable to receive programming. Further, the television receiver 118 may itself include user interface devices, such as buttons or switches. In many applications, the remote-control device ("remote") 128 is operable to control the television receiver 118 and/or the presentation device 120. The remote 128 typically communicates with the television receiver 118 using a suitable wireless medium, such as infrared ("IR"), radio frequency ("RF"), or the like. The television receiver 118 may also include other components, such as a digital video recorder, to record, store, and later present programming.

Examples of the presentation device 120 include, but are not limited to, a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled to the television receiver 118. Further, the television receiver 118 and the presentation device 120 may be integrated into a single device. Such a single device may have the above-described functionality of the television receiver 118 and the presentation device 120, or may even have additional functionality.

A content provider 104 provides program content, such as television content or audio content, to a distributor, such as the program distributor 106. Example content providers include television stations which provide local or national television programming, special content providers which provide premium based programming or pay-per-view programming, or radio stations which provide audio programming.

Program content, interchangeably referred to as a program, is communicated to the program distributor 106 from the content provider 104 through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

In at least one embodiment, the received program content is converted by the program distributor 106 into a suitable signal (a "program signal") that is communicated (i.e., "uplinked") by antenna 110 to satellite 112 (separately illustrated herein from, although considered part of, the communication system 108). The communicated uplink signal may contain a plurality of multiplexed (e.g., time division multiplexed) programs that are organized into distinct logical or physical channels. The uplink signal is received by the satellite 112 and then communicated (i.e., "downlinked") from the satellite 112 in one or more directions, for example, onto a predefined portion of the planet.

A receiver antenna 114 that is within reception range of the downlink signal communicated from satellite 112 receives the above-described downlink signal. Some types of receiver antenna 114 are operable to receive signals from a single satellite 112. Other types of receiver antenna 114 are operable to receive signals from multiple satellites 112 and/or from terrestrial based transmitters. In some embodiments, antenna 114 is a terrestrial "over-the-air" ("OTA") broadcast antenna that is configured to receive a program signal from a terrestrial based transmitter, such as broadcast transmit tower. Furthermore, in some cases, the television receiver 118 is operable to receive signals from multiple, distinct antennas, such as by including multiple tuners.

The receiver antenna 114 can be located at customer premises 116. Examples of customer premises 116 include a residence, a business, or any other suitable location operable to receive signals from satellite 112. The received signal is communicated, typically over a hard-wire connection, to a television receiver 118. The television receiver 118 converts, via an audio/video processor or similar component, the received signal from antenna 114 into a signal and/or format suitable for communication to a presentation device 120 or another device, such as a digital video recorder or a home computing system. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The television receiver 118 may receive programming partially from, or entirely from, another source other than the above-described receiver antenna 114. Other embodiments of the television receiver 118 may receive data from program distributors 106 and/or content providers 104 via locally broadcast RF signals, cable, fiber optic, Internet media, or the like.

In addition, information providers (not shown) may provide various forms of content and/or services to various devices residing in the customer premises 116. For example, an information provider may provide a Web page (or other information) to the television receiver 118 or other computing device. Information provider 138 may further perform or facilitate electronic commerce transactions, such as by operating as payment processor, online merchants, order fulfillment systems, or the like.

The above description of the content distribution environment 102 and the customer premises 116, and the various devices therein, is intended as a broad, non-limiting overview of an example environment in which various embodiments of a history-based decision facilitator may be implemented. FIG. 2 illustrates just one example of a content distribution environment 102 and that the various embodiments discussed herein are not limited to such environments. In particular, content distribution environment 102 and the various devices therein, may contain other devices, systems and/or media not specifically described herein.

Example embodiments described herein provide applications, tools, data structures and other support to implement a history-based decision facilitator. Other embodiments of the described techniques may be used for other purposes or contexts, such as for configuring desktop applications based on usage history. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Example User Interfaces and Device History Data

Figure 3B:
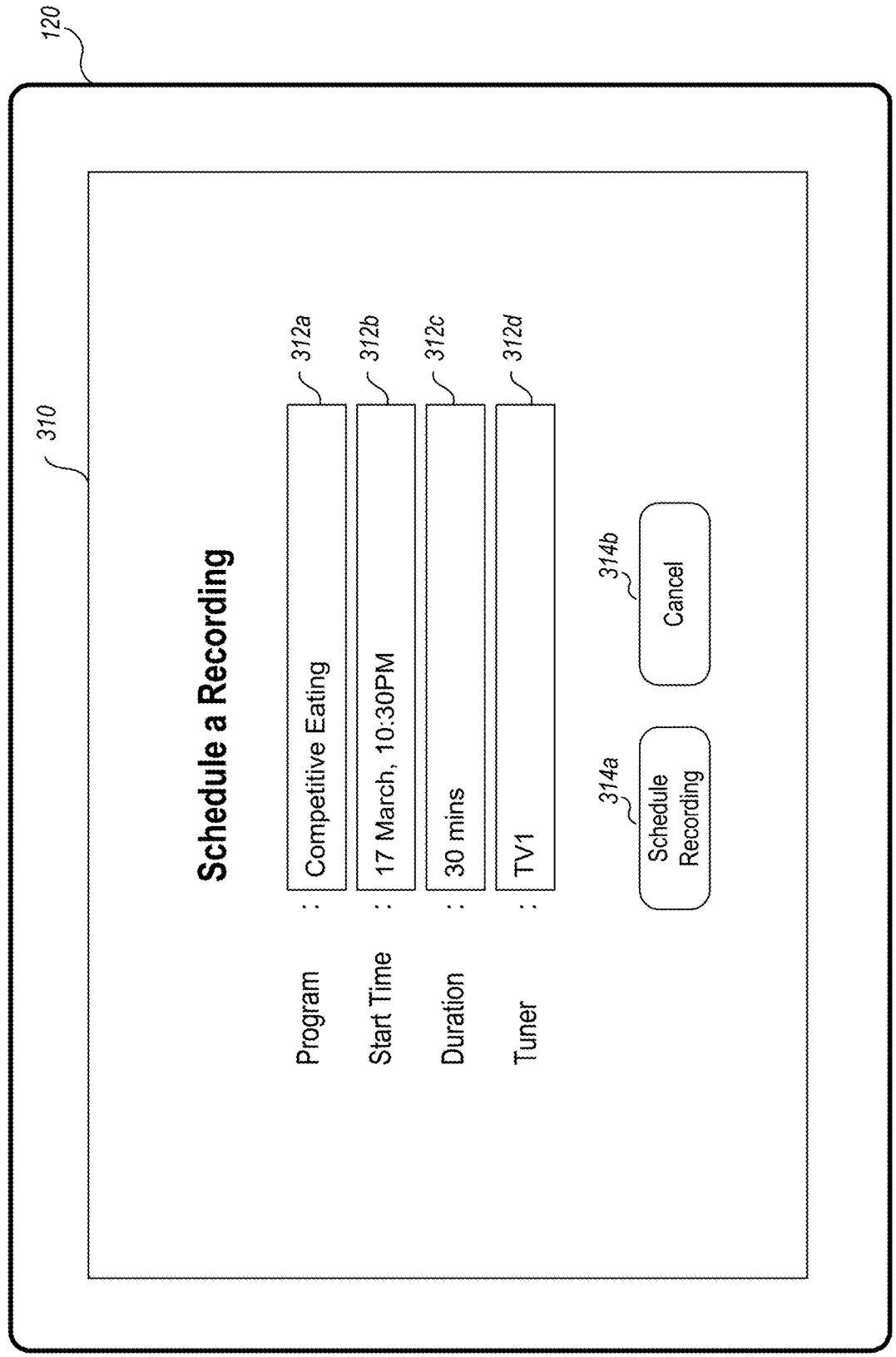

FIGS. 3A-3B are block diagrams illustrating example user interfaces and/or example device history data provided and utilized by example embodiments. In particular, FIG. 3A shows a table 200 illustrating example device history data utilized by an example embodiment. Table 200 includes device data arranged in rows 204a-204j and columns 202a-202h. The data of table 200 may be stored, for example, as device history data 155, described with reference to FIG. 1. Table 200 includes device data that reflects operations performed by multiple different television receivers, along with associated parameter values and related information. In particular, each row 204a-204j includes device data that was received from a single television receivers television receiver at a particular time, including television receiver identifier ("ID") 202a, operation 202b, channel number 202c, start time 202d, duration 202e, program identifier ("ID") 202f, and tuner 202g.

As noted above, the example device history data includes information about operations performed by television receivers at particular times or during particular time intervals. For example, row 204a indicates that a television receiver having the device identifier 1001 received and presented (e.g., performed a VIEW operation) a program (program ID 1234) received on channel 13 via tuner 1, starting on May 4, 2010, at 17:32 for a duration of 45 minutes. As another example, row 204b indicates that a television receiver having the device identifier 1023 recorded (e.g., performed a RECORD operation) a program (program ID 1009) received on channel 43 via tuner 2, starting on May 5, at 15:00 for a duration of 60 minutes. As a further example, row 204c indicates that a television receiver having the device identifier 1003 deleted (e.g., performed a DELETE operation) a previously recorded program (program ID 3473). Note that not all table cells contain relevant data for every type of action. For example, for the DELETE action, channel number 202c, duration 202e, and tuner 202g contain "--," indicating that such values are not relevant for the particular operation.

FIG. 3B shows an example a user interface screen 310 displayed by the television receiver 118 upon a presentation device 120. The screen 310 is a configuration screen that allows a user to schedule a future recording of a program. In this example, elements (e.g., user interface controls) 312a-312d respectively specify parameter values for the recording operation, including a program to record (e.g., "Competitive Eating"), a start time (e.g., 10:30 PM), a duration (e.g., 30 minutes), and a tuner (e.g., tuner 1) of the television receiver to utilize for the recording operation. User interface elements/controls include interactive and non-interactive user interface components or portions, including menus, buttons, text boxes/areas, text, graphics, and the like. Typically, at least some of the controls 312a-312d are pre-populated by the television receiver based on a program interactively selected by the user, such as via an electronic program guide or other mechanism. For example, in response to a user selecting the Competitive Eating program on an electronic program guide, the screen 310 is displayed, having at least some of controls 312a-312d pre-populated with, for example, program name, time, and duration. In some embodiments, one or more of controls 312a-312d may be interactive, in that the user can further adjust their values via the screen 310. Once the user is satisfied with the selections in controls 312a-312d, the user can schedule the recording by selecting control 314a. Alternatively, the user can cancel the recording by selecting control 314b.

As noted, the HBDF 100 utilizes device history data such as that shown in table 200 to assist television receivers in making various decisions. In this example, the television receiver 118 has pre-populated at least user interface control 312d (used to specify the tuner to utilize), based on a value received from the HBDF 100. In particular, when the user indicated that they wished to record a program beginning at 10:30, the television receiver transmitted to the HBDF 100 an indication that a record operation was being scheduled for 10:30, and received in return an indication to utilize tuner 1, based on a determination that tuner 1 was typically idle during that time period, for example because the user typically viewed programming in his bedroom via tuner 2 in the late evening.

In the illustrated example, the user can override the default value used by the television receiver 118 to pre-populate, based on device history information, user interface controls. For example, the user can select control 312d to initiate a drop down or other type of selection control in order to specify that a different tuner should be used.

In other applications, a television receiver may make, in cooperation with the HBDF 100, decisions that are transparent to the user. For example, some decisions are made for purposes other than determining default values to use for pre-populating user interface controls with suitable default values.

In general, the HBDF 100 can determine any operations and/or operation parameter values based on device history information. In at least some embodiments, the HBDF 100 facilitates resource allocation functions. A resource may include any hardware, firmware, or software component or element that has limited availability and/or capacity, such as a processor, storage device, tuner, or the like. Resource allocation may thus including assisting a television receiver in allocating or otherwise utilizing limited or finite resources, such as storage capacity, processor utilization, tuner availability, audio/video encoder/decoder availability, audio/video output ports, recorder capability, or the like. In one embodiment, there may be multiple functions competing for access to or use of a limited resource on a set-top box, and the HBDF 100 may allocate the resource by selecting some subset of the multiple functions that, when performed, would not over-utilize the limited resource.

As one example, a user may specify multiple programs to record on an ongoing basis. In some cases, the television receiver 118 may not be able to record all of the indicated programs, such as because during a particular time period there are more programs being transmitted than there are tuners in the television receiver 118. For example, suppose that the user specifies three programs (e.g., programs A, B, and C) to record, and all three programs are then scheduled for transmission during a same or overlapping time period. In such a case, a television receiver 118 having two tuners could not record all three programs. However, the HBDF 100 can assist the television receiver 118 in making an intelligent determination regarding which program or programs to record (or not record), based on device history information. For example, the HBDF 100 may determine that programs A and C are frequently viewed by the user, whereas program B is infrequently viewed, and accordingly recommend that the television receiver 118 record programs A and C.

As another example, a television receiver 118 may automatically adjust presentation settings, based on device information processed by the HBDF 100. For example, the HBDF 100 may determine that during a particular weekend time period, a television receiver 118 is used to view sports programming at high audio volume, and in response cause the television receiver 118 to automatically increase the audio volume during that time. Other presentation settings may be similarly adjusted, including determining to display video at a particular quality level (e.g., high definition, letter boxed, zoomed), determining to display subtitles or closed captioning, determining a particular audio type/quality to use, and the like.

In another embodiment, the HBDF may determine a function to perform that would free up (or increase availability of) some resource of the set-top box. For example, the television receiver 118 may automatically discard data. In particular, the television receiver 118 may detect that a storage device for recording programs (e.g., a hard disk) is at or near its capacity, such that it will not be able to perform a scheduled recording. The television receiver 118 can request that the HBDF 100 identify one or more previously recorded programs to be deleted, based on device history data. The HBDF 100 may determine that a particular program is frequently recorded but infrequently viewed, and accordingly recommend that program for deletion.

In addition, decisions facilitated by the HBDF 100 may be based on device history information obtained from multiple television receivers. For example, the HBDF 100 may aggregate device history data received from multiple distinct television receivers. Aggregating device history data may include performing a statistical analysis of multiple device history data records received from multiple distinct television receivers, in order to, for example, determine a frequency, mean, mode, median, maximum, minimum, or the like. In one embodiment, the HBDF 100 may determine one or more programs to be recorded based on the determined programs being more popular (e.g., because they are viewed more often by a community of users) than other programs. The HBDF 100 may aggregate device history information obtained from various user communities, including all users (e.g., reflected by device data received from all television receivers), regional users (e.g., reflected by device data received from television receivers in a particular city or state), demographic groups (e.g., reflected by device data received from television receivers associated with users of a particular age and/or gender), household users (e.g., device data received from television receivers located in the same premises), randomly selected users, and the like.

In some embodiments, the HBDF 100 first attempts to make a requested determination based on device history information that is specific to the requesting television receiver 118. If it is unable to do so, such as because it lacks sufficient device history data that is specific to the requesting television receiver 118, it may then utilize device data received from one or more other television receivers, such as another television receiver in the same premises as the requesting television receiver, television receivers in the same city, a random sampling of television receivers, or the like.

The table 200 of device history information may include more or less information, as indicated by row 204*j* and/or column 202*h*. For example, in some embodiments, the table 200 includes a column that identifies a user associated with the television receiver 118 for at least some of the recorded operations. In other embodiments, the table 200 includes one or more columns that include health or operational state data, such as free space available on a recording device, presentation settings (e.g., volume), or the like.

C. Example Computing System Implementation

Figure 4:
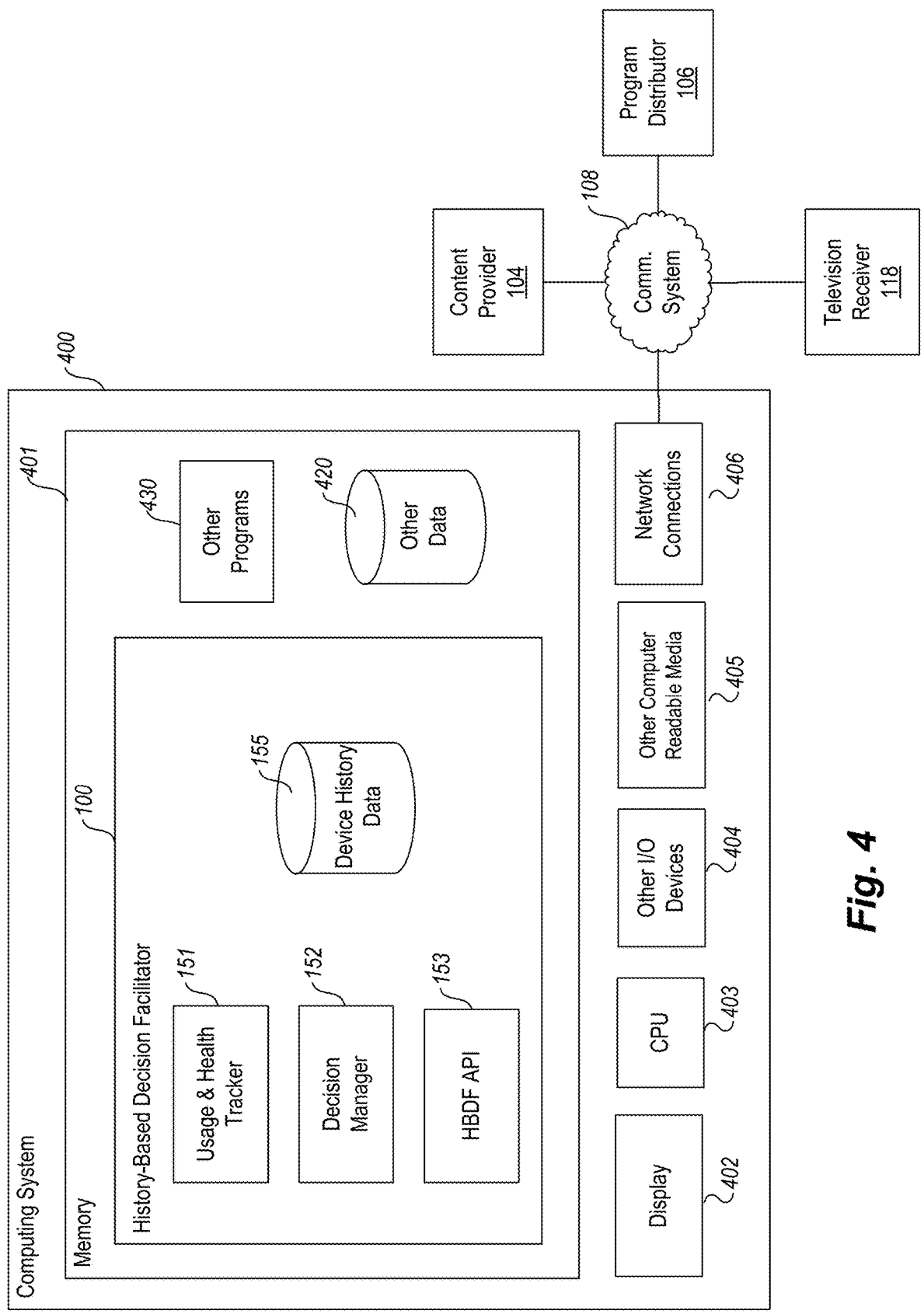
FIG. 4 is a block diagram of a computing system for practicing example embodiments of a history-based decision facilitator.

FIG. 4 is a block diagram of a computing system 400 for practicing example embodiments of an HBDF 100. In particular, FIG. 4 shows a computing system 400 that may be utilized to implement an HBDF 100. Note that one or more general purpose or special purpose computing systems/devices may be used to implement the HBDF 100. In addition, the computing system 400 may comprise one or more distinct computing systems/devices and may span distributed locations. Furthermore, each block shown may represent one or more such blocks as appropriate to a specific embodiment or may be combined with other blocks. Also, the HBDF 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., audio processor, video processor, keyboard, mouse, CRT or LCD display, and the like), other computer-readable media 405, and network connections 406. The HBDF 100 is shown residing in memory 401. In other embodiments, some portion of the contents, some of, or all of the components of the HBDF 100 may be stored on and/or transmitted over the other computer-readable media 405. The components of the HBDF 100 preferably execute on one or more CPUs 403 and facilitate history-based decision making, as described herein. Other code or programs 430 (e.g., a Web server, a database management system, or the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

In a typical embodiment, the HBDF 100 includes a usage and health tracker 151, a decision manager 152, and device history information 155 (e.g., stored in a data repository), as described with respect to FIG. 1.

The illustrated embodiment of the HBDF 100 also includes an HBDF application program interface ("API") 153. The API 153 provides programmatic access to one or more functions of the HBDF 100. For example, the API 153 may provide a programmatic interface to one or more functions of the HBDF 100 that may be invoked by one of the other programs 430 or some other module. In this manner, the API 153 facilitates the development of third-party software, such as user interfaces, plug-ins, adapters (e.g., for integrating functions of the HBDF 100 into other systems), and the like. In addition, the API 153 may be in at least some embodiments invoked or otherwise accessed via remote entities, such as the television receiver 118, to access various functions of the PSN 100. For example, the television receiver 118 may upload or otherwise transmit device history data to the HBDF 100 via the API 153.

The HBDF 100 interacts with various remote entities via the communication system 108, including the television receiver 118, the content provider 104, and/or the program distributor 106. As noted, the television receiver 118 transmits device history data to the HBDF 100 via the communication system 108; and the HBDF 100 transmits indications of determined operations and/or operation parameter values to the television receiver 118 via the communication system 108. In addition, the HBDF 100 may receive programming information (e.g., program schedule information), user information (e.g., information about users that are associated with television receivers), and the like via the communication system 108 from the content provider 104 and/or the program distributor 106.

In an example embodiment, components/modules of the HBDF 100 are implemented using standard programming techniques. For example, the HBDF 100 may be implemented as a "native" executable running on the CPU 403, along with one or more static or dynamic libraries. In other embodiments, the HBDF 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VB Script, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by an HBDF implementation. Also, other functions could be implemented and/or performed by each component/module, and in different orders, and by different components/modules, yet still achieve the functions of the HBDF 100.

In addition, programming interfaces to the data stored as part of the HBDF 100, such as in the data repositories 155 and 420, can be available by standard mechanisms such as through C, C++, C #, and Java APIs; libraries for accessing files, databases, or other data repositories; through markup languages such as XML; or through Web servers, FTP servers, or other types of servers providing access to stored data. The data repositories 155 and 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an HBDF.

Furthermore, in some embodiments, some or all of the components of the HBDF 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The illustrated program distributor 106, content provider 104, and television receiver 118 may be implemented using techniques similar to those described above. That is, each of the program distributor 106, content provider 104, and television receiver 118 may comprise one or more computing systems similar to computing system 400, and include functionality implemented by way of a suitable arrangement of hardware, firmware, and/or software components.

D. Example Processes

Figure 5:
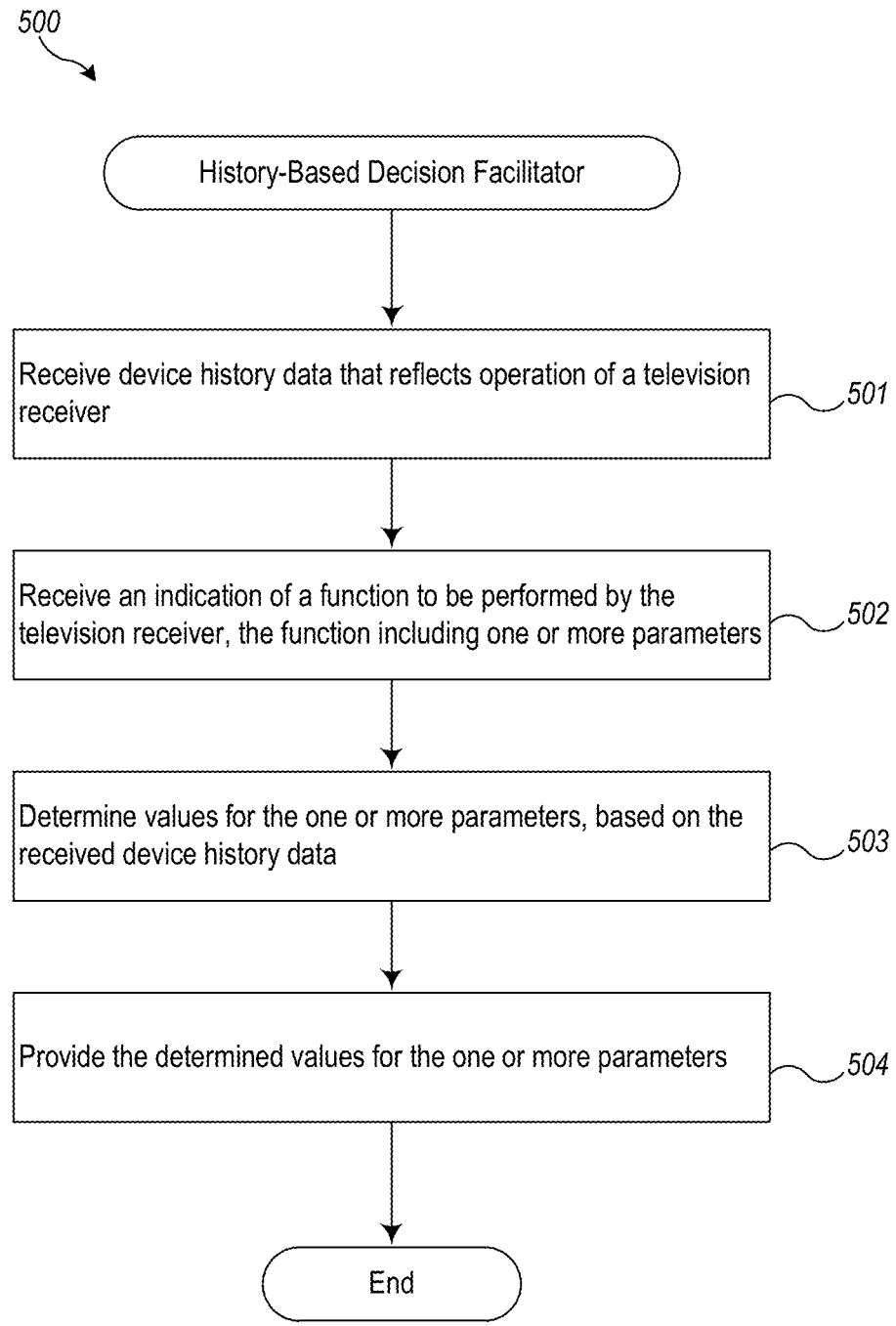
FIG. 5 is a flow diagram of an example history-based decision facilitator process provided by one example embodiment.

FIG. 5 is a flow diagram of an example HBDF process provided by one example embodiment. In particular, FIG. 5 illustrates a process 500 that may be implemented by, for example, one or more modules/components of the HBDF 100 as described with respect to FIGS. 1 and/or 4, above.

The illustrated process 500 starts at 501, where it receives device history data that reflects operation of a television receiver. As noted, device history data can include operational data, such as indications of various types of operations or functions performed by a television receiver along with associated parameter values, such as a television receiver identifier, a channel identifier, a program identifier, a time/date, a user identifier, or the like.

At 502, the process receives an indication of a function to be performed by the television receiver, the function including one or more parameters. In one embodiment, this includes receiving a request that includes a function identifier, such as a function name, along with indications of one or more parameters for which the process is to determine a value. In some cases, some of the one or more parameters may be accompanied with values that have already been set by the user (or some other source), while other of the one or more parameters may be identified as needing to have suitable values determined for them by the process.

At 503, the process determines values for the one or more parameters, based on the received device history data. Determining values for the one or more parameters may include obtaining device history data records that describe previous invocations of the same or similar function. Then, the obtained records may be processed to determine a suitable parameter value, such as the most frequently used parameter value, the most recently used parameter value, or the like. For example, when determining which tuner to use for a recording during a particular time period, the process may determine which tuner has been most frequently used during that time period over the past year (or other analysis window). In other cases, other device history data may be consulted to determine a suitable parameter value, including device history data records associated with other television receivers.

In some embodiments, determining values for the one or more parameters may also include determining or selecting a code module that is configured to make the determination. For example, the process may utilize a table or other structure that maps function names to handler code modules (e.g., objects, functions, processes) that are structured to perform the necessary processing of device history data (e.g., to execute one or more database queries) to determine suitable values for the indicated parameters. The HBDF can thus maintain an extensible architecture that provides for the addition of new or updated handler code modules that are each configured determine parameter values for one or more different types of functions.

At 504, the process provides the determined values for the one or more parameters. Providing the determined values may include storing and/or transmitting the values to the television receiver, thereby causing the television receiver to perform the function with the determined parameter values, or to perform some other operation with the determined parameter values, such as pre-populate one or more user interface controls with the determined values.

Then, the process ends. In other embodiments, the process may instead continue to one of steps 501-504 in order to receive and process additional device history data and/or determine additional parameter values.

Some embodiments perform one or more operations/aspects in addition to, or instead of, the ones described with respect to process 500. For example, in one embodiment, process 500 can also determine operations to be performed, such as automatically determining to record a program, based on an observation that that the television receiver has previously recorded the program or some similar program. In other embodiments, the process 500 may not perform one or more of the described operations. For example, the process may not receive device history data as described with respect to block 501, in that some other component or module may be responsible for receiving and storing the device history data. In such cases, the process may access the device history data previously stored and managed by some other component, such as by initiating execution of database queries against a remote database that contains device history data.

It should be emphasized that the above-described embodiments of the history-based decision facilitator 100 and related techniques are merely possible examples of implementations of the invention. Many variations and modifications may be made to the above-described embodiments. All such modifications and variations are intended to be included herein within the scope of this disclosure and protected by the following claims.

The invention claimed is:

1. A computing system for facilitating history-based decision making in a television receiver, comprising:
   a memory; and
   a module stored on the memory that is executed by a processor in the television receiver to:
   receive from one or more television receivers device history data,
      wherein the device history data includes indications of a plurality of previously performed view operations to view one of a program or a channel that has been viewed, a plurality of previously performed delete recording operations that have deleted a previously recorded programs, or a plurality of previously performed record operations that have recorded a program,
      wherein the indications of the previously performed view operations each include a time or a time interval defining times that the view operation was previously performed by an associated television receiver of the one or more television receivers,
      wherein the indications of the previously performed delete recording operations each include a time that the delete recording operation was performed by the associated television receiver,
      wherein the indications of the previously performed record operations each include a time or a time interval defining times that the record operation was previously recorded by the associated television receiver, and
      wherein the indications of the previously performed operations each include information that identifies the associated television receiver that performed the operation;
   receive an indication of a user-specified function to be performed by the television receiver, the user-specified function including one or more parameters that specify recording a program at an indicated time;
   accessing the device history data in response to receiving the indication:
   determine values for the one or more parameters,
      wherein the determined values for the one or more parameters are based on the device history data, and
      wherein the determined value controls the record operation that is to be performed by an identified television receiver when the program is recorded by the identified television receiver; and
   cause the identified television receiver to perform the recording based upon the determined values for the one or more parameters.

2. The computing system of claim 1, wherein the device history data indicates which tuners of the one or more television receivers in use at the indicated time or the indicated time interval that the previously performed record operation was performed by the associated television receiver, and wherein the determined values for the one or more parameters indicates the tuner of the identified television receiver that is to perform the recording.

3. The computing system of claim 1, wherein the module is further causes the computing system to:
   receive an indication that the identified television receiver is to record multiple programs at the indicated time, wherein a number of multiple programs to record exceeds a number of tuners in the identified television receiver;
   select a number of the programs for recording, the number of selected programs being equal to the number of tuners, based on viewing patterns represented by the device history data;
   identifying one or more different television receivers that have an available tuner that is available for recording at the indicated time; and
   performing a record oration by one or more different television receivers that have the available tuner at the indicated time so that the remaining number of multiple programs are recorded.

4. The computing system of claim 3, wherein the device history data indicates that the selected programs are more frequently viewed than other of the multiple programs that are not selected for recording.

5. The computing system of claim 1, wherein each of the television receivers has at least one tuner, wherein the device history data includes an indication of an operating tuner that had performed the view operation or that had preformed the record operation, and wherein the module is further causes the computing system to:
  select a first tuner of one of the television receivers based on the device history data indicating that a second tuner is typically in use at the indicated time or the indicated time interval that the previously performed operation was performed by the associated television receiver, and wherein the determined values for the one or more parameters indicates the first tuner of the television receiver that is to be selected to perform the function that includes the recording; and
  cause the television receiver to use the selected first tuner for the recording.

6. The computing system of claim 5, wherein the television receiver is coupled to multiple displays, wherein the device history data includes an indication of which of the multiple displays were used to view the program during the view a ration and wherein viewing patterns indicate that a user typically views programs via a display coupled to the second tuner.

7. The computing system of claim 1, wherein the television receiver is a set-top box that includes the computing system, and wherein the module is further configured to receive the device history data from a data store of the television receiver.

8. A computing system for facilitating history-based decision making in a television receiver, comprising:
  a memory; and
  a module stored on the memory, when executed, causes the computing system to:
    receive from one or more television receivers device history data,
      wherein the device history data includes indications of a plurality of previously performed view operations to view one of a program or a channel that has been viewed, a plurality of previously performed delete recording operations that have deleted a previously recorded program, or a plurality of previously performed record operations that have recorded a program that have been previously performed by a plurality of television receivers,
      wherein the indications of the previously performed view operations each include a time or a time interval defining times that the view operation was previously performed,
      wherein the indications of the previously performed delete recording operations each include a time that the delete recording operation was performed,
      wherein the indications of the previously performed record operations each include a time or a time interval defining times that the record operation was previously recorded, and
      wherein the indications of the previously performed operations each include information that identifies an associated television receiver of the plurality of television receivers that performed the operation;
    receive an indication of a user-specified function to be performed by an identified one of the plurality of television receivers, the user-specified function to be performed by the television receiver including one or more parameters that specify recording a program at an indicated time;
    accessing the device history data in response to receiving the indication:
    determine values for the one or more parameters, based on the device history data associated with the television receiver;
    determine that there is an insufficient amount of device history data about the identified television receiver to determine the values for the one or more parameters;
    in response to determining that there is insufficient device history data associated with the identified television receiver, determine the values for the one or more parameters based on the device history data received from at least one other television receiver of the plurality of television receivers; and
    cause the identified television receiver to perform the recording based upon the determined values for the one or more parameters.

9. The computing system of claim 8, wherein the module is further causes the computing system to:
  determine the values for the one or more parameters based on device history data received from at least one other television receiver located in a same premises as the identified television receiver.

10. The computing system of claim 8, wherein the module is further causes the computing system to:
  determine the values for the one or more parameters based on device history data received from at least one other television receiver associated with a user of a specified demographic group.

11. The computing system of claim 8, wherein the module is further causes the computing system to:
  determine the values for the one or more parameters based on device history data received from at least one randomly selected television receiver.

12. A method for facilitating history-based decision making in a television receiver, under control of a computer processor, the method comprising:
  receiving from one or more television receivers device history data,
    wherein the device history data includes indications of a plurality of previously performed view operations to view one of program or a channel that has been viewed, a plurality of previously performed delete recording operations that have deleted a previously recorded program, or a plurality of previously performed record operations that have recorded a program,
    wherein the indications of the previously performed view operations each include a time or a time interval defining times that the view operation was previously performed,
    wherein the indications of the previously performed delete recording operations each include a time that the delete recording operation was performed,
    wherein the indications of the previously preformed record operations each include a time or a time interval defining times that the record operation was previously recorded, and
    wherein the indications of the previously performed operations each include information that identifies an associated television receiver of the one or more television receivers that performed the operation;

receiving an indication of a user-specified function to be performed by the television receiver, the user-specified function including one or more parameters that specify recording a program at an indicated time;

accessing the device history data in response to receiving the indication;

determining values for the one or more parameters,
wherein the determined values for the one or more parameters are based on the device history data, and
wherein the determined value controls the record operation that is to be performed by an identified television receiver when the program is recorded by the identified television receiver; and causing the identified television receiver to perform the recording based upon the determined values for the one or more parameters.

13. The method of claim 12, further comprising:
determining that there is insufficient device history data about the identified television receiver to determine the values for the one or more parameters; and
in response, determining values for the one or more parameters based on the device history data received from at least one other television receiver.

14. The method of claim 13, further comprising:
determining the values for the one or more parameters based on device history data received from other television receivers located in a same premises as the television receiver.

15. The method of claim 12, further comprising:
receiving an indication from the identified one of the television receivers that the identified television receiver is to record multiple programs at the indicated time, a number of multiple programs to record exceeding a number of tuners in the identified television receiver; and
selecting a number of the programs for recording, the number of selected programs being equal to the number of tuners, based on a viewing pattern represented by the device history data, wherein the device history data indicates that the selected programs are more frequently viewed than other of the multiple programs that are not selected for recording.

16. The method of claim 12, wherein each of the television receivers has at least one tuner, and further comprising:
selecting a first tuner of one of the identified television receivers based on a viewing pattern represented by the device history data indicating that a second tuner in use at the indicated time or the indicated time interval that the previously performed operation was performed by the associated television receiver, and wherein the determined values for the one or more parameters indicates the first tuner of the television receiver that is to perform the function that includes the recording; and causing the identified television receiver to use the selected first tuner for the recording.

17. The method of claim 12, wherein receiving the device history data includes receiving multiple records that each describe an operation performed by the identified television receiver, each record indicating a device identifier of the identified television receiver.

18. A non-transitory, computer-readable storage medium storing contents that, when executed, cause a computing system to facilitate history-based decision making in a television receiver by performing a method comprising:
receiving from one or more television receivers device history data that includes indications of a plurality of previously performed view operations to view one of a program or a that has been viewed, a plurality of previously performed delete recording operations that have deleted a previously recorded program, or a plurality performed record operations that have recorded a program,
wherein the indications of the previously performed view operations each include a time or a time interval defining times that the previously performed view operation was performed,
wherein the indications of the previously performed delete recording operations each include a time that the delete recording operation was performed,
wherein the indications of the previously performed record operations each include a time or a time interval defining times that the record operation was previously recorded, and
wherein the indications of the previously performed operations each include information that identifies an associated television receiver of the one or more television receivers that performed the operation;
receiving an indication of a user-specified function to be performed by the television receiver, the user-specifed function including one or more parameters that specify operation of the user-specified function, the user-specified function including recording a program at an indicated time;
accessing the device history data in response to receiving the indication;
determining values for the one or more parameters,
wherein the determined values for the one or more parameters are based on the device history data, and
wherein the determined value controls the record operation that is to performed by an identified television receiver when the program is recorded by the identified television receiver; and
causing the identified television receiver to perform the recording based upon the determined values for the one or more parameters.

* * * * *